United States Patent [19]

Elmasry

[11] Patent Number: 4,619,990

[45] Date of Patent: Oct. 28, 1986

[54] POLYMERIC DYES WITH PENDENT CHROMOPHORE GROUPS CAPABLE OF UNDERGOING THERMOPLASTIC DEFORMATION

[75] Inventor: Mohamed A. Elmasry, Woodbury, Minn.

[73] Assignee: Minnesota Mining and Manufacturing Company, St. Paul, Minn.

[21] Appl. No.: 710,174

[22] Filed: Mar. 11, 1985

[51] Int. Cl.$^4$ .............. C07C 107/04; C07C 107/06; D09B 1/16; D09B 23/00; D09B 43/00; D09B 43/20; D09B 43/22; D09B 57/00

[52] U.S. Cl. .................... 534/573; 528/423; 430/56; 524/190; 430/69; 430/70; 524/198; 430/71; 430/72; 524/280; 430/73; 430/75; 524/292; 430/76; 524/556; 430/77; 524/557; 430/78; 430/495; 524/565; 524/715; 525/191; 525/204; 525/222; 525/227; 525/233; 525/238; 525/242; 525/279; 525/300; 525/301; 525/302; 525/312; 526/217; 526/218.1; 526/219; 526/219.1; 526/219.3; 526/220; 528/306; 528/308; 528/367; 528/369; 528/370; 528/422

[58] Field of Search .............. 534/573 P; 524/190, 524/198, 280, 292, 565, 556, 557, 715; 525/191, 204, 222, 227, 233, 238, 242, 279, 300, 301, 302, 312; 526/217, 218.1, 219, 219.1, 219.3, 220; 528/306, 308, 367, 369, 370, 422, 423; 430/56, 69, 70, 71, 72, 73, 75, 76, 77, 78

[56] References Cited

U.S. PATENT DOCUMENTS

| | | | |
|---|---|---|---|
| Re. 30,362 | 8/1980 | Gless et al. | 534/573 X |
| 1,500,844 | 7/1924 | Plauson | 534/573 X |
| 2,274,551 | 2/1942 | Kenyon et al. | 534/573 |
| 2,276,138 | 3/1942 | Alderman et al. | 534/573 X |
| 2,371,052 | 3/1945 | Kirby | 534/573 X |
| 2,473,403 | 6/1949 | Woodward | 534/573 X |
| 2,477,462 | 7/1949 | McQueen | 534/573 X |
| 2,994,693 | 8/1961 | Blake et al. | 534/856 X |
| 3,232,691 | 2/1966 | Wilhelm et al. | 8/1 |
| 3,278,486 | 10/1966 | Meek et al. | 534/851 X |
| 3,763,086 | 10/1973 | Kalopissis et al. | 534/573 |
| 3,832,339 | 8/1974 | Stocker et al. | 534/573 |
| 3,940,503 | 2/1976 | Bellanca | 426/540 |
| 4,017,476 | 4/1977 | Murray et al. | 534/573 |
| 4,107,336 | 8/1978 | Otteson et al. | 534/851 X |
| 4,169,203 | 9/1979 | Wingard et al. | 546/76 |
| 4,182,612 | 1/1980 | Sokol et al. | 8/10.1 |
| 4,189,380 | 2/1980 | Booth et al. | 534/851 X |
| 4,206,240 | 6/1980 | Bunes | 426/250 |
| 4,228,259 | 10/1980 | Kalopissis et al. | 525/435 |
| 4,233,328 | 11/1980 | Dawson et al. | 426/250 |
| 4,365,012 | 12/1982 | Hocker et al. | 430/19 |
| 4,367,282 | 1/1983 | Yagihara et al. | 430/381 |
| 4,369,292 | 1/1983 | Maslanka et al. | 524/535 |
| 4,511,492 | 4/1985 | Swedo et al. | 534/573 X |

FOREIGN PATENT DOCUMENTS

| | | | |
|---|---|---|---|
| 1526005 | 4/1968 | France | 534/573 |
| 44-13382 | 6/1969 | Japan | 534/573 |
| 57-28162 | 2/1982 | Japan | 534/573 |
| 59-45195 | 3/1984 | Japan | 534/573 |
| 59-62188 | 4/1984 | Japan | 534/573 |
| 7112489 | 12/1971 | Netherlands | 534/573 |

OTHER PUBLICATIONS

Ida et al., J. Pharm. Soc. Japan, vol. 89, pp. 517 to 530, (1969).

Kamogawa et al., Index Chemicus, vol. 32, #108232, (1969).

Machida, Derwent Japanese Patents Report, vol. 5, No. 39, p. 2:8, #17066/66, (11-01-66).

Savin et al., Chemical Abstracts, vol. 68, #69638k, (1968).

Primary Examiner—Floyd D. Higel
Attorney, Agent, or Firm—Donald M. Sell; James A. Smith; Lorraine R. Sherman

[57] ABSTRACT

Polymeric dyes having pendent chromophore groups which are selected from azo, tricyanovinyl, anthraquinone, methine, and indoaniline groups fall into two classes, [A] condensation polymers, and [B] polymers derived from copolymerized ethylenically-unsaturated monomers, the dyes being capable of undergoing thermoplastic deformation by a focused laser beam when in a layer of thickness in the range of 0.1 to 100 micrometers and having an absorptivity in the range of 10 to 250 $Lg^{-1}cm^{-1}$. They are film-forming, thermally- and light-stable, and solvent-coatable. These compounds are useful as coloring and light-absorbing agents, particularly as the light-absorbing agents in thin optical recording layers.

15 Claims, No Drawings

POLYMERIC DYES WITH PENDENT CHROMOPHORE GROUPS CAPABLE OF UNDERGOING THERMOPLASTIC DEFORMATION

FIELD OF THE INVENTION

This invention relates to polymeric dyes which contain a high proportion of certain classes of chromophore units. These compounds are useful as coloring and light-absorbing agents, particularly as the light-absorbing agents in thin optical recording layers.

BACKGROUND ART

Polymeric dyes are widely disclosed in the literature. Of particular importance is their use as food colorings and in the bulk and surface coloring of plastic objects and textile fibers. Their use as hair dyes, as tinting agents in paper manufacture, and in imaging systems as sensitizing agents is known in the art.

Kokai No. JA59-45195, laid open Mar. 13, 1984, discloses hydrocarbon backbone polymers with pendent chromophores, e.g., azo, anthraquinone, indigoid, cyanine, etc. Polymers are thermoplastic and film-forming, and are useful as thin coated layers for deformation optical recording.

Kokai No. JA59-62188, laid open Apr. 9, 1984, discloses various polymer backbones, e.g., polyester, polyurethane, polyamide, vinyl polymers, etc., with pendent phthalocyanine (preferably metal) chromophores. Polymers are thermoplastic and film-forming, and useful as thin coated layers for deformation optical recording.

Representative of polymeric dyes for food colorings are those disclosed in U.S. Pat. No. 4,206,240. Here pendent chromophore groups such as anthraquinones, azo dye moieties, etc., are linked at intervals to a hydrocarbon polymer backbone through nitrogen atoms which may be in the backbone or pendent from it. Solubility in aqueous systems is frequently a requirement of such food colorings and U.S. Pat. Nos. 4,233,328 and 4,169,203 disclose such polymeric dyes.

Polymeric dyes used in dyeing textiles and coloring textile polymers in bulk are disclosed in U.S. Pat. No. 3,232,691. These are derived from acrylate or methacrylate monomers with pendent chromophore groups of azo, anthraquinone, or triarylmethane dye moieties.

Hair dying compositions containing polymer dyes are described in U.S. Pat. Nos. 4,182,612 and 4,228,259. These dyes have polyethyleneimine type backbones with chromophores such as azo, anthraquinone, etc., pendent from the backbone nitrogen atoms. Graft copolymerized pigments for use as fillers in paper making are described in U.S. Pat. No. 4,369,292.

In silver halide photography polymeric color couplers derived from ethylenically-unsaturated monomers are disclosed in U.S. Pat. No. 4,367,282. Polymeric color couplers are also disclosed in U.S. Pat. No. 3,743,503 as developable coloring agents in electrographic toners.

U.S. Pat. No. 4,365,012 discloses photochromic cyclic polyimides for optical recording.

SUMMARY OF THE INVENTION

Briefly, the present invention provides novel polymeric dyes capable of undergoing thermoplastic deformation by a focused laser beam when in a layer of thickness in the range of 0.1 to 100 micrometers and having an absorptivity in the range of 10 to 250 $Lg^{-1}cm^{-1}$. They are film-forming, thermally- and light-stable, and solvent-coatable.

The polymeric dyes of the invention are useful as optical recording layers for which purpose they do not require the addition of a binder. The polymeric dye layer when used as an optical recording medium can be a thermoplastic, light absorbing layer comprising at least 10 percent by weight of at least one polymeric dye of the instant invention as is disclosed in Assignee's copending patent application U.S. Ser. No. 710,175, filed Mar. 11, 1985, wherein polymeric cyanine dyes, disclosed in Assignee's copending patent application U.S. Ser. No. 710,077, filed Mar. 11, 1985, are also useful. The polymeric dyes of the invention are capable of absorbing radiation in the visible range (i.e., 400–700 nm, preferably with peak absorptions in the range of 450–650 nm). The dyes, although sufficiently absorbing of wavelengths in a selective absorption region to allow thermoplastic deformation of the layer by a focused laser beam, are sufficiently stable so as not to be destroyed under these conditions.

It is known in the art to use molecular dyes dispersed in thermoplastic binders for deformation recording (e.g., U.S. Pat. Nos. 4,364,986 and 4,380,796). The use of polymeric dye layers without any binder has the following advantages over that art.

1. High chromophore concentrations can be obtained without the special solubility relationships required between dye and binder.

2. High clarity of the layer is easily obtained thus giving less background noise.

3. The chromophores do not migrate or become lost from the layer during the thermoplastic action, thus facilitating reuse.

4. There is no danger of dye crystallization on storage.

5. Polymeric dyes are frequently more stable to heat than the individual dyes, e.g., IR chromophores.

In general, the polymeric dyes of the invention are linear homopolymers of chromophoric moieties, or linear random or condensed copolymers or homopolymers of chromophoric and non-chromophoric moieties or more than one chromophoric moiety. In the visible and near UV regions representative dyes can consist of a polymeric backbone containing at least one of phenylene and imino groups, with chromophores selected from at least one of the azo dyes and tricyanovinylated aryl compounds.

As used in this application:

"thermoplastic deformation" means a stable alteration of the form of a plastic substance under the influence of heat, the altered form being capable of returning to its unspoiled state by further application of heat;

"polymeric dye" means a dye molecule having at least five recurring monomeric units;

"chromophore" means a radiation-absorbing group of atoms that provides a colored molecule;

"auxochromic group" means a group of atoms that intensifies the color of a chromophore, i.e., usually a substituent on a chromophore; and "alkyl", "alkoxy", "alkylamino", "dialkylamino" mean groups containing 1 to 6 carbon atoms for each "alkyl" unless otherwise specified, "methine" means a

group to provide a moiety with alternating single and double bonds; and

"tricarbocyanine" or "carbocyanine" means a seven-membered methine chain connecting two heterocyclic nitrogen-containing groups where the nitrogen atoms are part of the conjugated chain; and "absorption coefficient", b, means $$-\frac{1}{d} \ln T.$$

DETAILED DESCRIPTION OF THE INVENTION

Polymeric dyes for the practice of this invention having pendent chromophore groups selected from azo, tricyanovinyl, anthraquinone, methine, and indoaniline groups fall into two classes, [A] condensation polymers, and [B] polymers derived from copolymerized ethylenically-unsaturated monomers, as follows:

[A] This class comprises polymeric dyes of the general formula

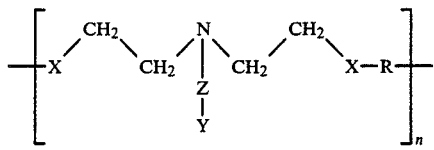

wherein n can be an integer from 5 to 100,000, preferably from 5 to 10,000, which are formed as condensation polymers of diacids, dihaloformates, or diisocyanates having the formulae I below, and dihydroxy compounds with pendant arylamine groups having the formula II below which are capable of condensation polymerization with compounds of formulae I. Formulae I monomers can be

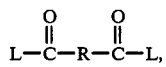

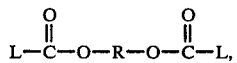

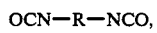

where
L can be —Cl or —Br, and
R can be an aliphatic (straight-chain, branched, or cyclic) or aromatic (single or fused ring) hydrocarbon with up to 30 carbon atoms.

Formula II monomers can be

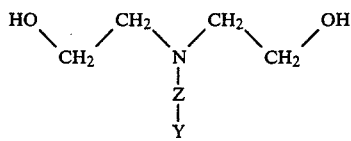

where
Z is a linking group which can be a substituted or unsubstituted phenylene or naphthylene group wherein the substitution groups are —Br, —F, —OH, alkyl, alkoxy, alkylamino, dialkylamino, —NH$_2$, —NO$_2$, phenyl, carbamoyl, —CN, carbalkoxy

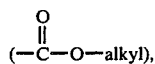

sulfonyl, sulfamyl, and sulfamido,
Y completes a chromophore chosen from classes (1) to (4) below, and
X can be condensation residues

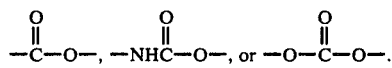

Chromophores and linking groups represented by Z—Y include:

(1) Azo groups where Z is as defined above, and Y can be —N=N—D or —N=N—G—N=N—D, and D can be an aromatic nucleus of 1 to 5 rings (fused or connected by single bonds), or a heterocyclic ring of 4, 5, or 6 members containing one to four or more atoms of —N—, —S—, and nonperoxidic atoms —O— optionally bearing one or more auxochromic groups as substituents chosen from groups such as —Cl, —Br, —F, —OH, alkyl, alkoxy, alkylamino, dialkylamino, —NH$_2$, —NO$_2$, phenyl, carbamoyl, —CN, carbalkoxy

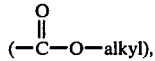

sulfonyl, sulfamyl, and sulfamido and G is a phenylene or napthylene group, (2) Tricyanovinyl groups where Z can be as defined above, and
Y can be

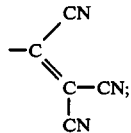

(3) Anthraquinone groups where Z can be as defined above or can be a single bond, and
Y can be

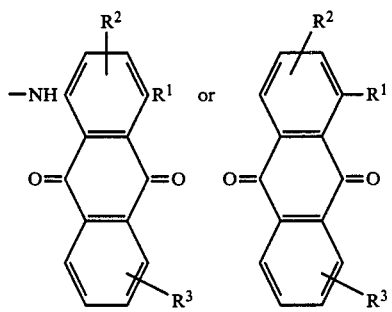

where $R^1$ can be —OH, —NH$_2$, alkylamine, dialkylamino, or arylamino where aryl is phenyl or phenyl substituted by auxochromic groups as defined for use on D as defined in (1) above, $R^2$ and $R^3$ independently can be auxochromic groups as defined for use on D as defined in (1) above;

(4) Methine groups where Z can be as defined above for [A](1), and
Y can be

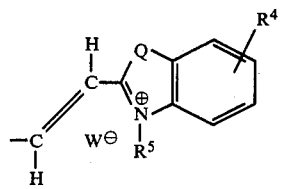

in which
Q can be

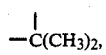

—S—, —Se—, or —O—.

$R^4$ can be an auxochromic group as in (1) above,
$R^5$ can be alkyl ($C_1$–$C_{18}$) or an anion group as in zwitterion moieties in which case W is not present W is an anion such as Cl$^-$, Br$^-$, ClO$_4^-$, CF$_3$SO$_3^-$, BF$_4^-$, PF$_6^-$, CH$_3$SO$_3^-$, C$_2$F$_5$C$_6$H$_{10}$SO$_3^-$, and other anions commonly used with methine dyes.

General preparative methods for class [A] polymers having polyester, polycarbonate, or polyurethane backbones, as exemplified using various chromophores are as follows:

(a) Polyester or polycarbonate copolymers (azo dyes)

A mixture of 0.01 mole of the arylazophenyliminodiethanol dye, 0.01 mole of aryl diacid chloride or aryldichloroformate, 40 mL of 1,2-dichloroethane, and 3 mL (0.038 mole) of pyridine was refluxed for one hour, then cooled, coagulated in 300 mL of ethanol in a home blender, and filtered off. The polymeric dye was returned to the blender, blended twice with water, and dried.

(b) Polyurethane copolymer (azo dyes)

A solution of 0.1 mole of the arylazophenyliminodiethanol dye in 40 mL of dry dimethylsulfoxide was added all at once to a solution of 0.1 mole of diisocyanate in 40 mL of cyclohexanone. The reaction mixture was heated while stirring for three hours at 115° C., cooled, and the polymeric dye extracted as in (a) above.

(c) Polyurethane copolymer-tricyanovinyl dye

A solution of 0.1 mole of the aryliminodiethanol in 40 mL of dry dimethylsulfoxide is added to a solution of 0.1 mole of diisocyanate in 40 mL of cyclohexanane. The reaction mixture is heated with stirring for three hours at 115° C. and the uncolored polymeric dye precursor is extracted as in (a) above. Tricyanovinylation of the non-chromophoric polymer to give the dye may be accomplished by reacting them with tetracyanoethylene in dimethyl formamide or pydrine at 50°–55° C. for ½ hour.

(d) Polyester copolymer-methine dye

Phenyliminodiethanol is reacted with an aryldiacid chloride as in (a). The uncolored polymer is 100% formulated with excess dimethylformamide in the presence of POCl$_3$ by conventional technique, and then condensed with a compound of the structure

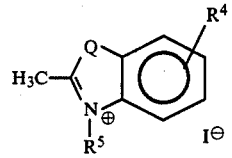

in which Q, $R^4$, $R^5$ as defined in [A](4) above, to give a polymethine dye/polyester copolymer.

(e) Polyester, polycarbonate, polyurethane copolymer-anthraquinone dyes

Anthraquinone precursors are commercially available as dye intermediates, such as

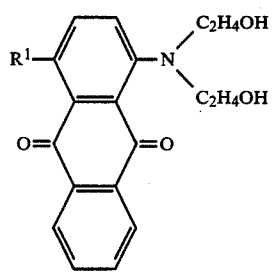

wherein $R^1$ is as defined above, and may be condensed directly with diacid halides, dihaloformates, or diisocyanates as indicated above.

[B] This class comprises copolymers (preferably random) having 5 to 100,000 monomeric units derived from ethylenically-unsaturated monomers, at least one having formula III and at least one having formula IV III—any ethylenically-unsaturated monofunctional monomer not including any chromophoric moieties, for example,

| | |
|---|---|
| $CH_2{=}CR^6{-}\overset{O}{\underset{\|}{C}}{-}R^7$ | (meth)acrylamide or (meth)acrylate monomer |
| $CH_2{=}CH{-}OR^8$ | vinyl ether monomer |
| $CH_2{=}CH{-}O{-}\overset{O}{\underset{\|}{C}}{-}R^8$ | vinyl ester monomer |
| $CH_2{=}CR^6{-}CN$ | meth(acrylonitrile) monomer | where
$R^6$ can be —H or —CH$_3$
$R^7$ can be —OR$^8$ or —NHR$^8$
$R^8$ can be alkyl ($C_1$–$C_{18}$)

IV—chromophore-containing ethylenically-unsaturated monomers including

| | |
|---|---|
| $CH_2{=}CR^6{-}\overset{O}{\underset{\|}{C}}{-}O{-}R^9{-}Z{-}Y$ | (meth)acrylate dye |
| $CH_2{=}CR^6{-}\overset{O}{\underset{\|}{C}}{-}NH{-}R^9{-}Z{-}Y$ | (meth)acrylamide dye |

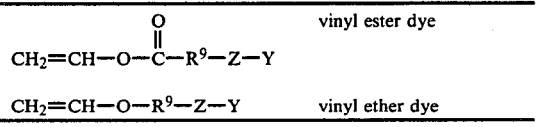 vinyl ester dye

CH$_2$=CH—O—R$^9$—Z—Y    vinyl ether dye where R$^6$ can be —H or —CH$_3$ independently of formula III monomer Z-Y can be chromophore and linking group as defined in classes [B](1)-(4) below, similar to [A](1) to [A](4), with the additional class [B](5) below, Z can be those radicals defined in the equivalent classes of [A] and, in addition in [B](5) Z is a single bond, and R$^9$ can be a linking group defined individually for chromophores in [B](1) to [B](5) below.

Examples of dyes in Class [B] include
(1) Azo dyes
Z and Y can be defined as in [A](1),
R$^9$ can be a single bond or

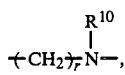

wherein R$^{10}$ can be —H or alkyl (C$_1$-C$_8$), and r is an integer 1 to 6;

(2) Tricyanovinyl dyes
Z and Y can be defined as in [A](2), and
R$^9$ can be

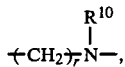

wherein R$^{10}$ and r can be as defined in [B](1);

(3) Anthraquinone dyes
Z and Y can be defined as in [A](3),
R$^9$ as in [B](1);

(4) Polymethine and methine dyes
Z and Y can be defined as in [A](4), and
R$^9$ as in [B](2);

(5) Indoaniline dyes
wherein
R$^9$ can be

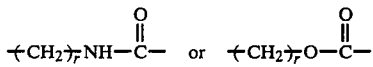

r can be an integer 1 to 6,
Z can be as defined above or it can be a single bond
and
Y can be

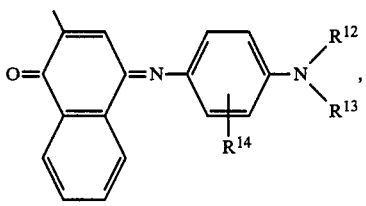

or

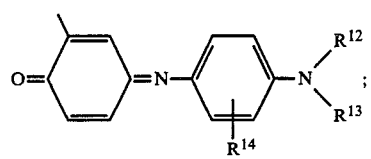

or
R$^9$ can be

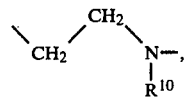

wherein R$^{10}$ can be —H or alkyl (C$_1$-C$_8$), and then
Z can be as defined above or it can be a single bond, and
Y can be

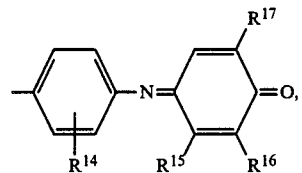

or

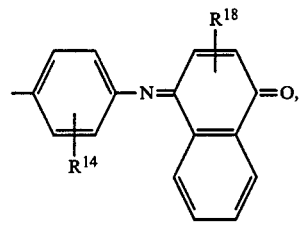

in which
R$^{14}$, R$^{15}$, R$^{16}$, R$^{17}$ can be —H, halogen (—Cl, —Br), alkyl or alkoxy (C$_1$-C$_8$),
R$^{12}$, R$^{13}$ can be alkyl (C$_1$-C$_8$), and
R$^{18}$ can be an auxochromic group as defined on D in [A](1) above.

Examples of the monomers [B]IV having azo dye chromophores may be found in British Pat. Nos. GB 1,200,216 and GB 1,269,627, and examples having anthraquinone dye chromophores are disclosed in Soc. Chim. de France Bull., page 1196 (1975).

General preparative method for Class [B] poly(meth)acrylate polymers is as follows:
(a) Copolymerization of at least two monomers in any relative amounts
  (i) the azo or anthraquinone dye (meth)acrylate monomer as disclosed in UK No. 1,200,216, methine dye monomer, indoaniline dye monomers, or N-alkyl-N-(meth)-acryloyloxyethyl-aniline(toluidine)
  (ii) (meth)acrylate comonomer with 1 weight percent 1-dodecane mercaptan and 1 weight percent of azobisisobutylnitrile as initiator (percent related to total monomers) in toluene was heated at 79° C.±1° C. for 5 hours. When a dye (meth)acrylate is used the resulting solution of polymeric dye in toluene may be coated as it is or may be extracted by coagulating in 300 mL of ethanol in a home blender, and then filtered and dried.

(b) Tricyanovinylation of the non-chromophoric polymers prepared in (a) (ii) immediately above may be accomplished by reacting them with tetracyanoethylene in dimethylformamide or pyridine at 50°–55° C. for about ½ hour.

Other polymeric dyes with other chromophores can be prepared as is known in the art. It is also within the scope of the present invention to polymerize two or more different chromophoric monomers.

Preferred examples of polymeric dye units of classes [A] and [B] for use in optical recording layers are as follows:

(1) Azo dye polymer units of the class [A](1) having the formula

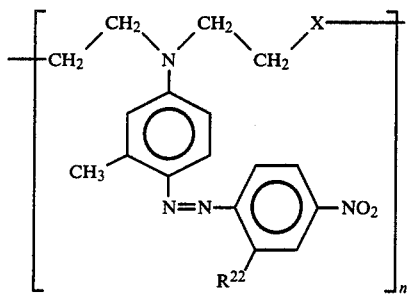

where X can be

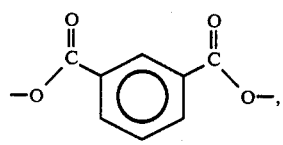

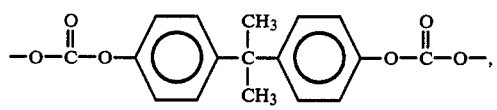

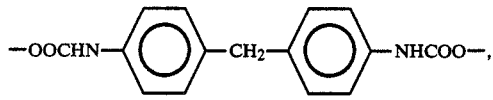

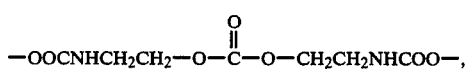

and $R^{22}$ can be —OCH$_3$, —Cl, or —H, these three R groups providing peak absorptions at 488, 514, and 475 nm, respectively, m is an integer of 1 to 18, n is the number of units in the polymer chain is in the range of 5 to 100,000 or more, which are prepared by copolymerization of an azo dye of the formula X below, with the following six representative monomers (IX-a, IX-b, IX-c, IX-d, IX-e, and IX-f)

IX

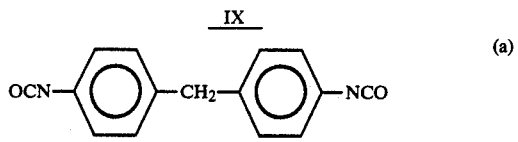 (a)

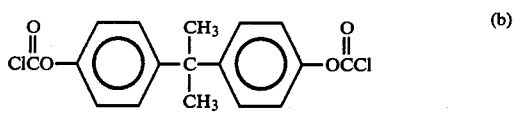 (b)

 (c)

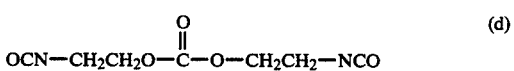 (d)

 (e)

 (f)

wherein m is an integer 1 to 18

X

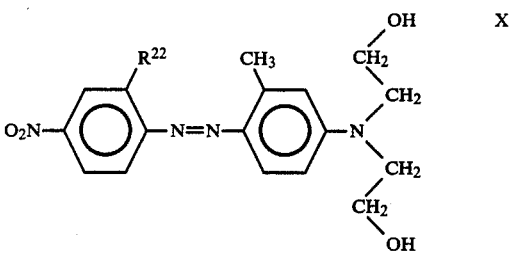

wherein $R^{22}$ is as defined above. These condensation polymerizations necessarily produce alternating chains derived from monomers IX and X. Final average molecular weights are often fairly well defined at between 8,000 and 20,000. These polymeric azo dyes have good solubility in cyclohexanone and chlorinated solvents and can be spin-coated or dip-coated from a solution to give smooth, transparent, uniform films with no flaws. They absorb in the visible range with an absorptivity as defined below at the peak wavelength of 50 Lg$^{-1}$cm$^{-1}$, which translates to a layer absorption coefficient of about 6–8×10$^4$ cm$^{-1}$.

(2) Tricyanovinylated polyaryliminodiethanol esters of the class [A](2) having units of the formula

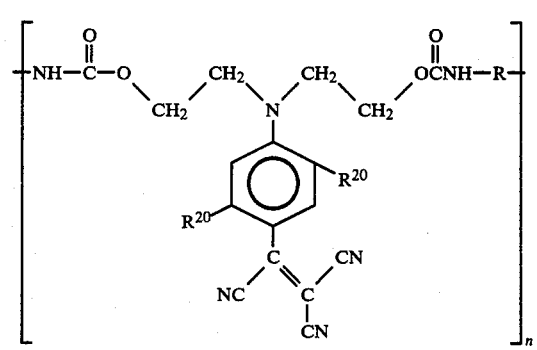

where R is any aliphatic or aromatic hydrocarbon preferably with up to 20 carbon atoms, and n can be an integer of 5 to 100,000.

An Example of such polymeric dyes in which R is

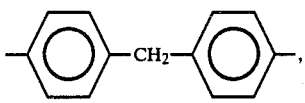

and $R^{20}$ is —$CH_3$, —H, or —$OCH_3$, has $\lambda max = 519$ nm in methyl ethyl ketone (MEK)

These are made by reacting a compound of the formula

wherein R is as defined above, with the chromophore precursor used by Sulzburg & Cotter, *Macromolecules* 2 (2) March/April 1969 (page 146) having the formula

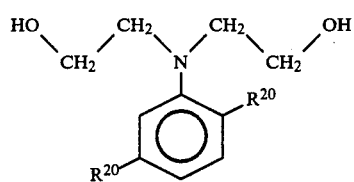

giving a polymer which is then reacted with tetracyanoethylene in dimethyl formamide or pyridine at 50°–55° C. for about ½ hour to give a polymeric dye of molecular weight in the range 15,000 to 50,000.

(3) An example of an [A](3) novel anthraquinone dye of the invention has units of the formula

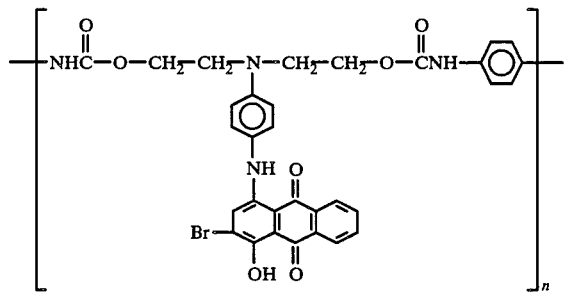

wherein n is an integer of 5 to 100,000.

(4) Novel polymeric dyes of the class [A](4) derived from styryl dyes have units of the formula

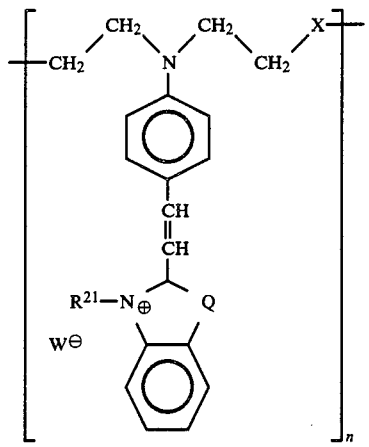

where X is a non-chromophoric group as defined above in preferred examples [A](1) above. and —Q is

—S—, —Se—, or —O—,
$R^{21}$ is alkyl ($C_1$–$C_{20}$), and
n is 5 to 100,000.

An example in which Q is

$R^{21}$ is ethyl, W is the anion $I^-$, and x is

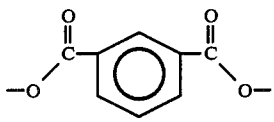

gives $\lambda max = 546$ nm. This dye was prepared as shown in the scheme below;

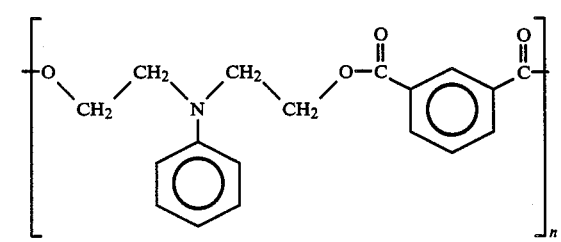

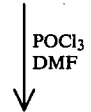

-continued

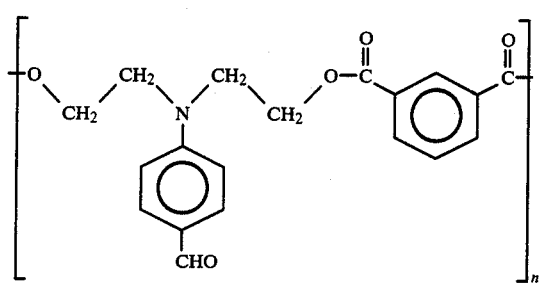

+

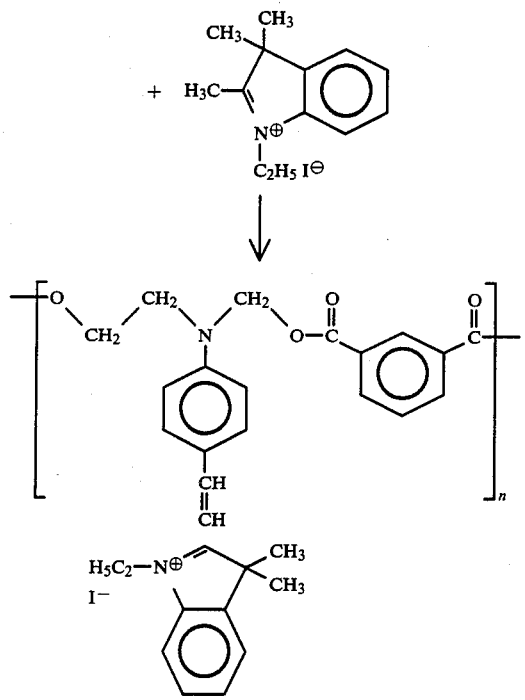

wherein n can be an integer of 5 to 100,000, and which has λmax=546 nm. NMR showed 100 percent formylation of the benzene ring.

(5) An example of a novel polymeric dyes of class [B]1 can have the formula

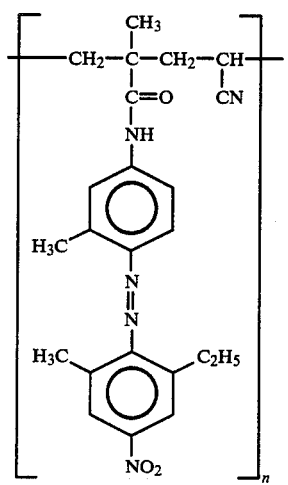

wherein n can be an integer of 5 to 100,000.

(6) Novel polymeric dyes of the class [B](2) can be prepared by starting with the monomer

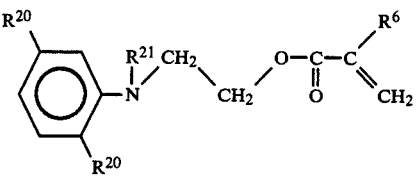

wherein $R^6$ is —H or —$CH_3$, $R^{21}$ is alkyl, $R^3$=—$CH_3$, —H, or —$OCH_3$, and $R^{20}$ is independently —$CH_3$, —H, or —$OCH_3$.

Polymerization of these ethylenically-unsaturated monomers is by standard methods well known in the art except that the addition of a chain transfer agent such as 1-dodecanemercaptan is needed to prevent crosslinking through the reactive hydrogen on the methylene group next to the imide nitrogen. Tricyanovinylation of the obtained polymer may be accomplished by reaction with tetracyanoethylene in dimethyl formamide or pyridine at 50°–55° C. for about ½ hour, and can be used, for example, to prepare the following terpolymer:

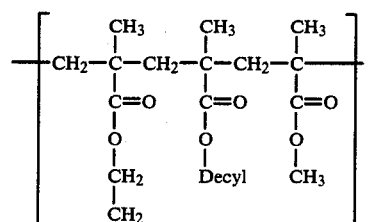

λmax = 505 nm (film)
λmax = 510 nm (CHCl₃)

wherein n is 5 to 100,000, and in which the three pendent chains are disposed at random along the backbone.

(7) An example of a polymeric dye of class [B](3) can have the formula

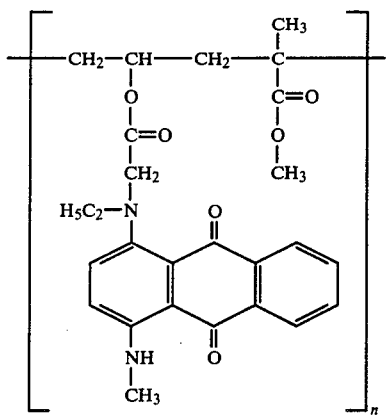

wherein n can be an integer of 5 to 100,000.

(8) An example of a polymeric dye of class [B](4) can have the formula

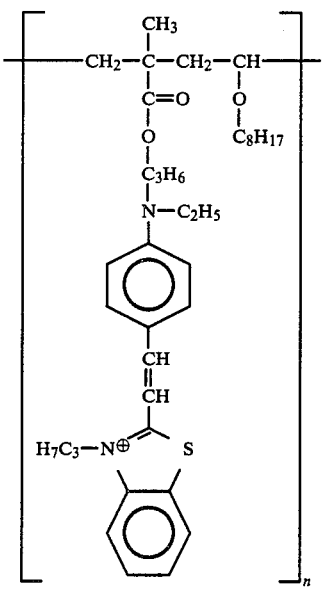

wherein n can be an integer of 5 to 100,000.

(9) Novel polymeric dyes derived from indoaniline class [B](5) having the formula

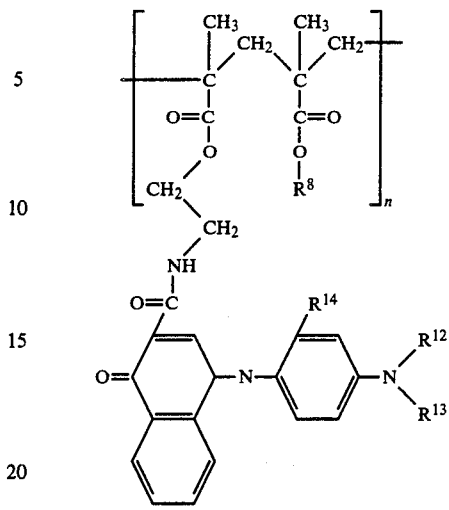

wherein $R^{12}$, $R^{13}$, $R^{14}$ can independently be alkyl ($C_1$-$C_6$), n can be an integer of 5 to 100,000, and $R^8$ can be alkyl ($C_1$-$C_8$), and in which the two pendent chains are disposed randomly along the backbone.

A sample of this class (in n-butyl acetate) wherein $R^8$ is —$CH_3$, $R^{12}$ is —$C_2H_5$, $R^{13}$ is —$C_2H_5$, and $R^{14}$ is —$CH_3$ has λmax=654.5 nm.

When used as light absorbing agents in optical recording layers, the concentration of chromophores in the polymeric dye should be as high as possible in order to attain high coated layer absorption coefficients in the range of $10^3$ to $10^5$ cm$^{-1}$. Non-chromophoric monomers may be used in the copolymers to assist in the providing of the required physical properties such as film-forming, non-crystallinity, $T_G$, solvent solubility, adhesion to substrate, etc. In some cases however it may be possible to produce satisfactory physical properties from chromophoric monomers alone.

It is preferable that the chromophore chosen should have a high molar extinction coefficient so that the absorption coefficient of the layer is not unduly limited by the need to copolymerize with non-chromophoric monomers.

Although with normal molecular chromophores it is common to describe their light absorbing efficiency by the molar extinction coefficient, it is neither satisfactory nor reliable to use this measure with polymeric materials. A useful measure of the absorption of polymeric dyes in bulk is given by the absorptivity, a, in units Lg$^{-1}$cm$^{-1}$ where a expressed in terms of the transmission factor T of a solution of concentration c g/L and thickness d cm is given by $$-\frac{1}{d \cdot c} \ln T.$$

Values of absorptivity are in the range of 15 to 100 Lg$^{-1}$cm$^{-1}$, and preferably 25 to 75 Lg$^{-1}$cm$^{-1}$, and have been obtained with the polymeric dyes of the invention.

The polymeric dyes of this invention should be substantially linear in their form. The acceptable range of polymer chain lengths is also determined by the resultant physical properties, but chains containing about 5 chromophore units upwards to about 100,000 chromophore units will be useful. The molecular weight range can be from about 500 to about 10,000,000 but a preferred range is from about 5000 to about 100,000. The most preferred range is from 7,000 to 30,000. The preferred chromophore content is in the range of 40 to 100 mol percent. In optical recording with lasers, it is particularly important to be able to choose the wavelength of peak absorption of the absorbing material in a wide range of wavelengths. By suitable choice of the chromophores in the present invention, the range covered can be from 300 nm to 1000 nm. It is possible to have more than one absorption peak either by choice of the chromophore or by polymerization using more than one type of chromophore.

Non-chromophoric monomers useful in preparing the polymers of the invention are disclosed above.

At the exposing laser wavelength within the dye absorption band, the absorption coefficient of the layer should be at least $10^3$ cm$^{-1}$ in order that images may be formed when laser beams in the milliWatt range are used rather than higher powers.

The polymeric dyes of the instant invention can also be useful as coloring agents for foods, plastics, textile fibers, paper and in imaging systems.

Objects and advantages of this invention are further illustrated by the following examples, but the particular materials and amounts thereof recited in these examples, as well as other conditions and details, should not be construed to unduly limit this invention.

EXAMPLES

Example 1

The following polymeric azo dyes were prepared using different non-chromophoric monomeric links A. The resulting Tg values are given. $\epsilon\lambda$max in the range $2.5-3.0\times10^4$ L.mol$^{-1}$ cm$^{-1}$ based on a molecular weight of one unit of the polymer were obtained.

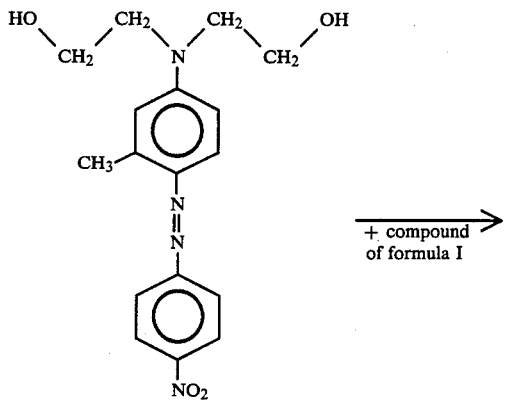

+ compound of formula I

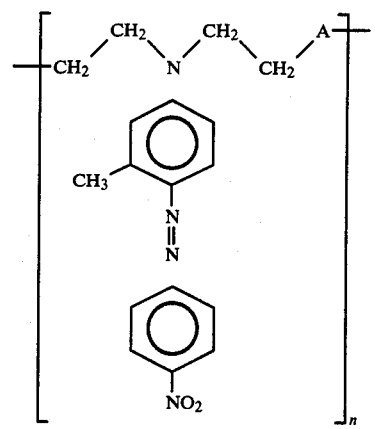

giving a polyester where

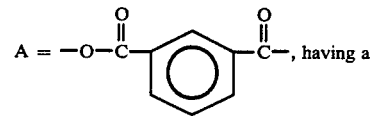, having a

Tg = 101° C.

polycarbonate where

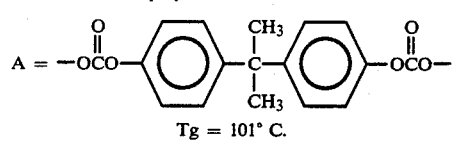

Tg = 101° C.

polyurethane where

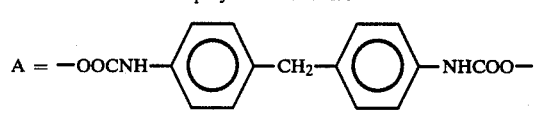

Tg = 131° C.

urethane carbonate $$A = -OOCNHCH_2CH_2-O\overset{\overset{O}{\|}}{C}O-CH_2CH_2NHCOO-$$

Tg = 80° C.

Example 2

Comparative tests of the polymeric dyes of the invention (see below) against three materials known in the art (1. trilayer disk, 2. photochromic layer disk, 3. thermoplastic layer having soluble dye therein) were made in terms of carrier to noise ratio (C/N) for a range of recording beam power levels. The measurements were carried out using an acousto-optic modulator giving short repetitive pulses of laser light of 50 ns duration at a frequency of 10 MHz. Suitable optics imaged the light onto a layer coated onto each of the disks. The results showed a threshold response characteristic commonly found in Trilayer disks as opposed to a broad response of both the photochromic and thermoplastic+dye systems. The polymeric dye also showed a carrier to noise ratio of 55 dB which is close to that of the Trilayer disk and much higher than the others.

The polymeric dye used in these tests was

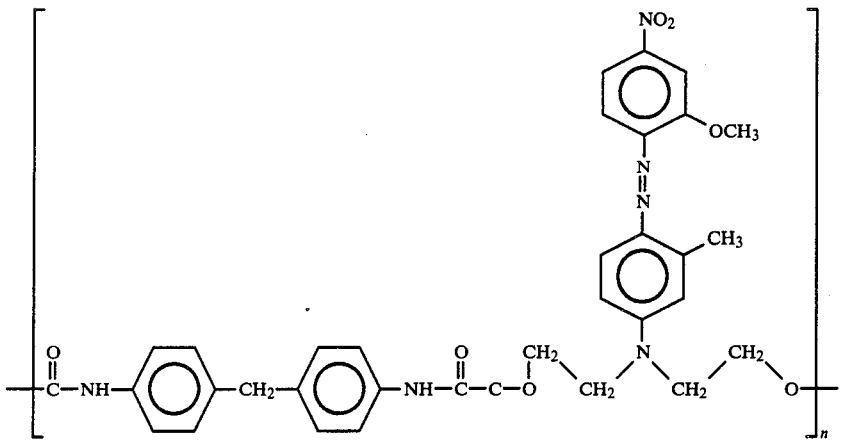

wherein n is an integer in the range of 5 to 100,000.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A polymeric dye selected from classes [A] and [B] wherein Class [A] is a dye polymer comprising repeating units of the formula

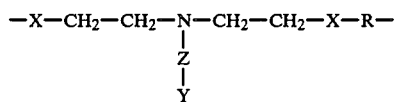

said repeating units numbering between 5 and 100,000, wherein

X is

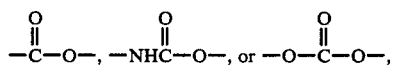

R is a hydrocarbon chain with up to 30 carbon atoms selected from the class consisting of straight chain aliphatic, branched chain aliphatic, cycloaliphatic, single or fused ring aromatic, Z is (1) phenylene or naphthlene, or (2) a single bond when Y is an anthraquinone moiety, Y is a chromophore moiety selected from the group consisting of an azo moiety, tricyanovinyl moiety, an anthraquinone moiety, and a methine or a polymethine moiety, and Class [B] is a dye polymer consisting essentially of units of copolymers derived from ethylenically-unsaturated monomers, at least one of which is a monomer of subclass III and at least one of which is a monomer of subclass IV wherein Subclass III is a non-chromophore-containing monomer selected from the group consisting of
(meth)acrylate monomer,
(meth)acrylamide monomer,
vinyl ether monomer,
vinyl ester monomer, and
meth(acrylonitrile) monomer, and Subclass IV is selected from the group consisting of
(meth)acrylate dye,
vinyl ester dye, and
vinyl ether dye,
with the proviso that Class IV monomers contain a pendent tricyanovinyl, methine, or polymethine dye group.

2. The polymeric dye of Class [A] according to claim 1 wherein when the moiety Z is phenylene or naphthylene it is substituted by one or more substitutents selected from the group consisting of —Cl, —Br, —F, —OH, alkyl ($C_1$-$C_6$), alkoxy, alkylamino, dialkylamino, —NH$_2$, —NO$_2$, phenyl, carbamoyl, —CN, carbalkoxy, sulfonyl, sulfamyl, and sulfamido.

3. The polymeric dye of Class [B] according to claim 1 wherein
subclass III is selected from the group consisting of

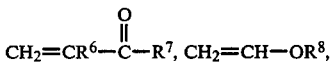

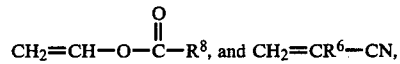

wherein
$R^6$ is H or $CH_3$,
$R^7$ is —$OR^8$ or —$NHR^8$,
$R^8$ is alkyl ($C_1$-$C_{18}$), and subclass IV is selected from the group consisting of

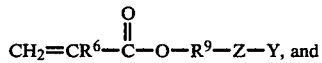

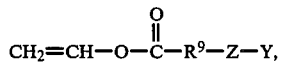

wherein
$R^6$ is independently —H or —$CH_3$,
Z is (1) phenylene or naphthylene,
Y is a chromophore moiety selected from the group consisting of a tricyanovinyl moiety, a methine moiety, and a polymethine moiety, and
$R^9$ is

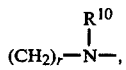

wherein $R^{10}$ is —H or alkyl ($C_1$ to $C_8$), and r is an integer 1 to 6.

4. The polymeric dye according to claim 1 which is capable of undergoing thermoplastic deformation by a focused laser beam.

5. The polymeric dye according to claim 1 which when in a layer of thickness in the range of 0.1 to 100 micrometers has an absorptivity in the range of 10 to 250 $Lg^{-1}cm^{-1}$.

6. The polymeric dye according to claim 1 which is film-forming.

7. The polymeric dye of Class [A] as recited in claim 1 wherein the chromophore is selected from the class consisting of (1) Azo groups where Y=—N=N—D or —N=N—G—N=N—D and D is an aromatic nucleus of 1-5 rings, or a heterocyclic ring of 4, 5, or 6 members containing one or more atoms of N, S, and non-peroxidic O atoms, and G is a phenylene or naphthylene group;

(2) Tricyanovinyl groups where

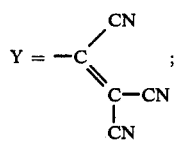

(3) Anthraquinone groups where

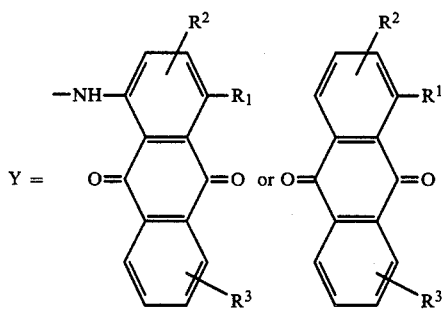

where
$R^1$ is —OH, —$NH_2$, alkylamine, dialkylamino, or arylamino where aryl is a phenyl group;
$R^2$ and $R^3$ are independently auxochromic groups as defined in (1) above, and
Z is a single bond or phenylene or naphthalene;

(4) Methine groups wherein

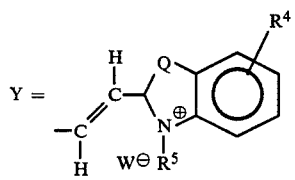

in which
Q is —C($CH_3$)$_2$, —S—, —Se—, or —O—, $R^4$ is an auxochromic group —Cl, —Br, —F, —OH, alkyl, alkoxy, alkylamino, dialkylamino, —$NH_2$, —$NO_2$, phenyl, carbamoyl, —CN, carbalkoxy

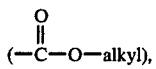

sulfonyl, sulfamyl, and sulfamido and G is a phenylene or naphthylene group,
$R^5$ is (1) alkyl ($C_1$-$C_{18}$), or (2) an anion group of a zwitterion dye and W is not present,
W is a dye anion.

8. The polymeric dye according to claim 7 wherein said aromatic nucleus or heterocyclic ring of said azo group further comprises one or more auxochromic groups as substituents selected from the group consisting of —Cl, —Br, —F, —OH, alkyl ($C_1$-$C_6$), alkoxy, alkylamino, dialkylamino, —$NH_2$, —$NO_2$, phenyl, carbamoyl, —CN, carbalkoxy, sulfonyl, sulfamyl, and sulfamido.

9. The polymeric dye according to claim 3 wherein Z is substituted by —Br, —F, —OH, alkyl, alkoxy, alkylamino, dialkylamino, —$NH_2$, —$NO_2$, phenyl, carbamoyl, —CN, carbalkoxy, sulfonyl, sulfamyl, or sulfamido.

10. A polymeric dye polymer having repeating units of the formula

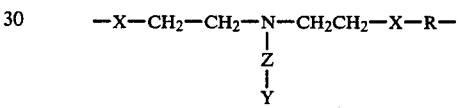

said repeating units numbering between 5 and 100,000, wherein
X is

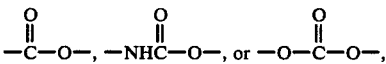

R is a hydrocarbon chain with up to 30 carbon atoms selected from the class consisting of straight chain aliphatic, branched chain aliphatic, cycloaliphatic, single or fused ring aromatic groups,
Z is (1) a phenylene or naphthylene group, or (2) a single bond when Y is an anthraquinone moiety,
Y is a chromophore moiety selected from the group consisting of an azo moiety, a tricyanovinyl moiety, an anthraquinone moiety, and a methine, or a polymethine moiety.

11. The polymeric dye according to claim 10 wherein Z is substituted by —Br, —F, —OH, alkyl, alkoxy, alkylamino, dialkylamino, —$NH_2$, —$NO_2$, phenyl, carbamoyl, —CN, carbalkoxy, sulfonyl, sulfamyl, or sulfamido.

12. A polymeric dye prepared by the condensation of a compound chosen from the group consisting of

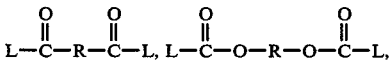

and OCN-R-NCO, wherein L=—Cl or or —Br, R=a straight-chain, branched, cyclic aliphatic or single or fused ring aromatic hydrocarbon with up to 30 carbon atoms, with a compound having the general structure.

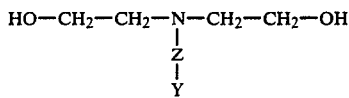

wherein
z is (1) a phenylene or naphthylene group, or (2) a single bond when Y is an anthraquinone moiety,
Y completes an azo, tricyanovinyl, anthraquinone, methine or polymethine chromophone.

13. The polymeric dye according to claim 12 wherein Z is substituted by —Br, —F, —Oh, alkyl, alkoxy, alkylamino, dialkylamino, —NH$_2$, —NO$_2$, phenyl, carbamoyl, —CN, carbalkoxy, sulfonyl, sulfamyl, or sulfamido.

14. A polymeric dye prepared by the copolymerization of at least two monomers, at least one of which is chosen from each of (a) and (b) wherein
(a) is

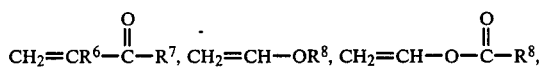

or CH$_2$=CH—CN, and
(b) is

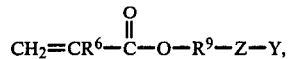

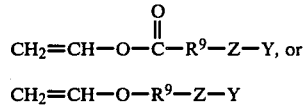

CH$_2$=CH—O—R$^9$—Z—Y wherein
R$^6$ is —H or —CH$_3$,
R$^7$ is —OR$^8$ or —NHR$^8$,
R$^8$ is alkyl or 1 to 18 carbon atoms,
R$^9$ is a linking group,
Z is a phenylene or naphthylene group, and
Y is a tricyanovinyl, methine or polymethine chromophore group.

15. The polymeric dye according to claim 14 wherein Z is substituted by —Br, —F, —OH, alkyl, alkoxy, alkylamino, dialkylamino, —NH$_2$, —NO$_2$, phenyl, carbamoyl, —CN, carbalkoxy, sulfonyl, sulfamyl, or sulfamido.

* * * * *